US005408734A

United States Patent [19]

Mills et al.

[11] Patent Number: 5,408,734

[45] Date of Patent: Apr. 25, 1995

[54] ARROWHEAD EXTRACTOR

[76] Inventors: Buster Mills, 746 Rumsey Rd., Columbus, Ohio 43207; Leslie C. Clem, P.O. Box 20272, Columbus, Ohio 43220

[21] Appl. No.: 227,518

[22] Filed: Apr. 14, 1994

[51] Int. Cl.[6] .............. B23P 19/04

[52] U.S. Cl. .............. 29/264

[58] Field of Search .............. 29/256, 263, 264

[56] References Cited

U.S. PATENT DOCUMENTS

| | | | |
|---|---|---|---|
| D. 256,606 | 8/1980 | Hoggard . | |
| 3,462,988 | 8/1969 | Tudor et al. | 29/264 |
| 3,890,692 | 6/1975 | Jandura, Jr. . | |
| 4,043,020 | 8/1977 | Hoggard . | |
| 4,169,454 | 10/1979 | Jones . | |
| 4,194,278 | 3/1980 | Sanders | 29/264 |
| 4,387,697 | 6/1983 | Duke . | |
| 4,478,204 | 10/1984 | Kocsan . | |
| 4,584,983 | 4/1986 | Ament . | |
| 4,957,095 | 9/1990 | Cameron . | |

FOREIGN PATENT DOCUMENTS 1489969 6/1989 U.S.S.R. .

*Primary Examiner*—Robert C. Watson
*Attorney, Agent, or Firm*—Richard C. Litman

[57] ABSTRACT

An arrowhead extractor provides for the extraction of bladed or non-bladed arrowheads from relatively dense objects in which the arrowhead is imbedded, by securing an arrowhead extractor shaft to the arrowhead shank and threadibly withdrawing the extractor shaft and attached arrowhead from the object in which the arrowhead was imbedded. A barrel serves as a housing for the extractor shaft, and a threaded collar mates with the extractor shaft to draw the extractor shaft and attached arrowhead into the barrel portion of the device. The extractor shaft is keyed to the barrel portion and the barrel portion is seated firmly against the object in which the arrowhead is imbedded, so no rotational force is applied to the arrowhead which would otherwise cause any blades thereon to break. The device applies a steady, concentric tensile force along the shank of the arrowhead, to minimize the potential for damaging the arrowhead. The device provides further utility in holding an arrowhead for the attachment, removal, and/or sharpening of blades and attachment or removal of arrow shafts thereto or therefrom, and in straightening bent arrowhead shanks.

19 Claims, 2 Drawing Sheets

ARROWHEAD EXTRACTOR

FIELD OF THE INVENTION

The present invention relates generally to devices providing for the removal of an article from another object in which the article is seated or imbedded, and more specifically to an arrowhead extractor for the removal of arrowheads from relatively firm and resistant materials (e. g., tree trunks or wood). The present arrowhead extractor operates by threadedly withdrawing an extractor shaft from the extractor body, with the extractor shaft being secured to the arrowhead. The present extractor has further utility by assisting in the installation and removal of arrow shafts from arrowheads, holding arrowheads for sharpening, etc.

BACKGROUND OF THE INVENTION

Broadhead arrowheads having multiple relatively thin, sharp blades are commonly used in archery hunting. Such blades have relatively high penetrating power and are capable of exerting relatively great damage to an animal, enabling the hunter to bring down the animal efficiently. Such arrowheads have their drawbacks, though, in that the velocity imparted by a longbow or compound bow imparts considerable momentum to the arrow, which is transferred to the object struck by the arrowhead. Such impact forces generally do not result in great difficulty in extracting an arrow from relatively soft material such as animal flesh or soft targets, but if the broadhead arrowhead penetrates relatively firm material (such as wood) to any degree, it can be exceedingly difficult to withdraw the arrowhead without additional tools or aids.

Accordingly, various devices have been developed to assist in the removal of arrowheads from objects in which the heads are imbedded, as will be discussed further below. Most of those devices operate on the principle of the slide hammer, resulting in intermittent violent force being imparted to the arrowhead. The resulting noise from the impacts is also undesirable in a hunting environment, as such sounds can result in frightening away game in the area, either the intended target which was missed or other nearby game. In addition, while many such devices have some additional function (e.g., as a bow stabilizer), none provide any additional function in the servicing of arrowheads and shafts, as does the present invention.

The need arises for an arrowhead extractor which uses a different principle of operation than prior extractors, by threadedly withdrawing an arrowhead from an object in which the arrowhead is imbedded. The resulting operation is practically silent, thus enabling a hunter to avoid further frightening any game which may be in the area. The device should also provide additional functions in holding an arrowhead to allow an archer to sharpen blades, attach and remove arrow shafts, etc., thus providing a multipurpose tool for the archer.

DESCRIPTION OF THE PRIOR ART

U.S. Pat. No. 3,890,692 issued to John J. Jandura, Jr. on Jun. 24, 1975 discloses a Process And Apparatus For The Removal Of Arrows. The apparatus is an elongated shaft with a concentric threaded hole at one end providing for attachment to a mating arrowhead threaded shank, and a knurled handle on the other end. The method disclosed for using the device comprises twisting the tool after securing it to the arrowhead, to loosen the arrowhead from its imbedded state. Accordingly, the device is limited to use with non-bladed tips, as the blades of a broadhead arrowhead could not be twisted in their imbedded position. The present invention does not twist the arrowhead relative to the object in which it is imbedded, for removal therefrom.

U.S. Pat. No. 4,043,020 issued to Anthony J. Hoggard on Aug. 23, 1977 discloses an Arrowhead Extractor using a slide hammer principle. While the abstract notes that means are provided to retain the shaft in the housing to prevent accidental noise in the field, this would only apply to the carriage or storage of the device and not to its actual use; it is not seen how repeated blows from the slide hammer could be muffled sufficiently to provide essentially quiet operation. The hammer and shaft portions are rotationally fixed when the hammer is retracted, so the shaft can be threaded to the arrowhead shank, but otherwise the hammer portion is free to rotate. The central extractor and the outer body of the present invention are locked together rotationally at all times.

U.S. Pat. No. 4,169,454 issued to Lonnie M. Jones on Oct. 2, 1979 discloses a Combination Of An Archery Bow, Bow Stabilizer And Arrow Head Extractor. The weight normally secured to the end of the stabilizer rod is removed and the weight is threaded to the shank of the arrowhead after removing the arrow shaft. The stabilizer rod is then passed through a transverse hole in the weight and used as a lever to pry the blade from its imbedded position. If the prying or levering force is not applied essentially perfectly coaxially along the arrowhead shaft or shank, the shank may be bent or broken and the blades of a broadhead arrowhead may also be bent or broken, thus necessitating replacement. The present extractor applies the extracting force evenly, continually, and coaxially along the arrowhead shank or shaft, and does not use any angular or rotational force to pry or twist the arrowhead from its imbedded position.

U.S. Pat. No. 4,387,697 issued to J. Douglas Duke on Jun. 14, 1983 discloses a Arrow Point Puller And Bow Stabilizer which operates on the same principle as that of the Hoggard device discussed above. The Duke device provides for attachment to a bow as a stabilizer, however, unlike the present invention.

U.S. Pat. No. 4,478,204 issued to Joseph A. Kocsan on Oct. 23, 1984 discloses a System Of A Bow Stabilizer And An Imbedded Arrow Head Remover. The weight on the stabilizer shaft must be loosened to act as the hammer when the device is to be used as an arrowhead extractor, thus requiring the precise repositioning of the weight when the stabilizer is replaced in order to ensure the precise tuning of the stabilizer and bow. Otherwise, the Kocsan extractor operates using the same principle as that of the Hoggard and Duke devices discussed above.

U.S. Pat. No. 4,584,983 issued to Gary S. Ament on Apr. 29, 1986 discloses an Archery Bow Stabilizer And Imbedded Arrowhead Remover essentially along the lines of the Duke and Kocsan devices discussed above. Again, a slide hammer principle of extraction is used, unlike the present invention.

U.S. Pat. No. 4,957,095 issued to Ronald D. Cameron on Sep. 18, 1990 discloses an Archery Bow Stabilizer And Imbedded Arrowhead Remover similar to the Duke, Kocsan, and Ament devices discussed above and operating on the slide hammer principle, unlike the present invention.

U.S. Pat. No. Des. 256,606 issued to Anthony J. Hoggard on Aug. 26, 1980 discloses an Arrowhead Remover comprising a relatively thick, flat material having plural passages therethrough. The passages appear to be sized to allow arrowheads of two to five blades to pass therethrough, depending upon the specific passage. No function or method of operation is disclosed by the design patent.

Finally, Soviet Patent No. 1,489,969 and published on Jun. 30, 1989 discloses a Mechanised Hand Tool For Screwing Threaded Sleeves. No similarity is seen to the present invention, as the device does not include plural slots for the capture of arrowhead blades or the like, nor does the body of the device (described as a nut) remain stationary in use, but rotates. Such rotation would defeat the purpose of the present device, in which it is essential that the body or barrel of the device remain stationary relative to the object in which the arrowhead is imbedded, to provide a solid fixture for the withdrawal of the arrowhead.

None of the above noted patents, taken either singly or in combination, are seen to disclose the specific arrangement of concepts disclosed by the present invention.

SUMMARY OF THE INVENTION

By the present invention, an improved arrowhead extractor is disclosed.

Accordingly, one of the objects of the present invention is to provide an improved arrowhead extractor which provides for the extraction of an arrowhead from a relatively dense object in which the arrowhead is imbedded, by applying a steady and constant concentric tensile force to the shank of the arrowhead.

Another of the objects of the present invention is to provide an improved arrowhead extractor which is adaptable for use with non-bladed arrowheads, as well as bladed arrowheads having plural blades of different numbers.

Yet another of the objects of the present invention is to provide an improved arrowhead extractor which also provides for the secure holding of an arrowhead for the installation, removal, or sharpening of the blades thereof, or for the installation or removal of an arrow shaft to or from an arrowhead.

Still another of the objects of the present invention is to provide an improved arrowhead extractor which is also adaptable for use in straightening the shank of an arrowhead which has been bent after striking an object.

A final object of the present invention is to provide an improved arrowhead extractor for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
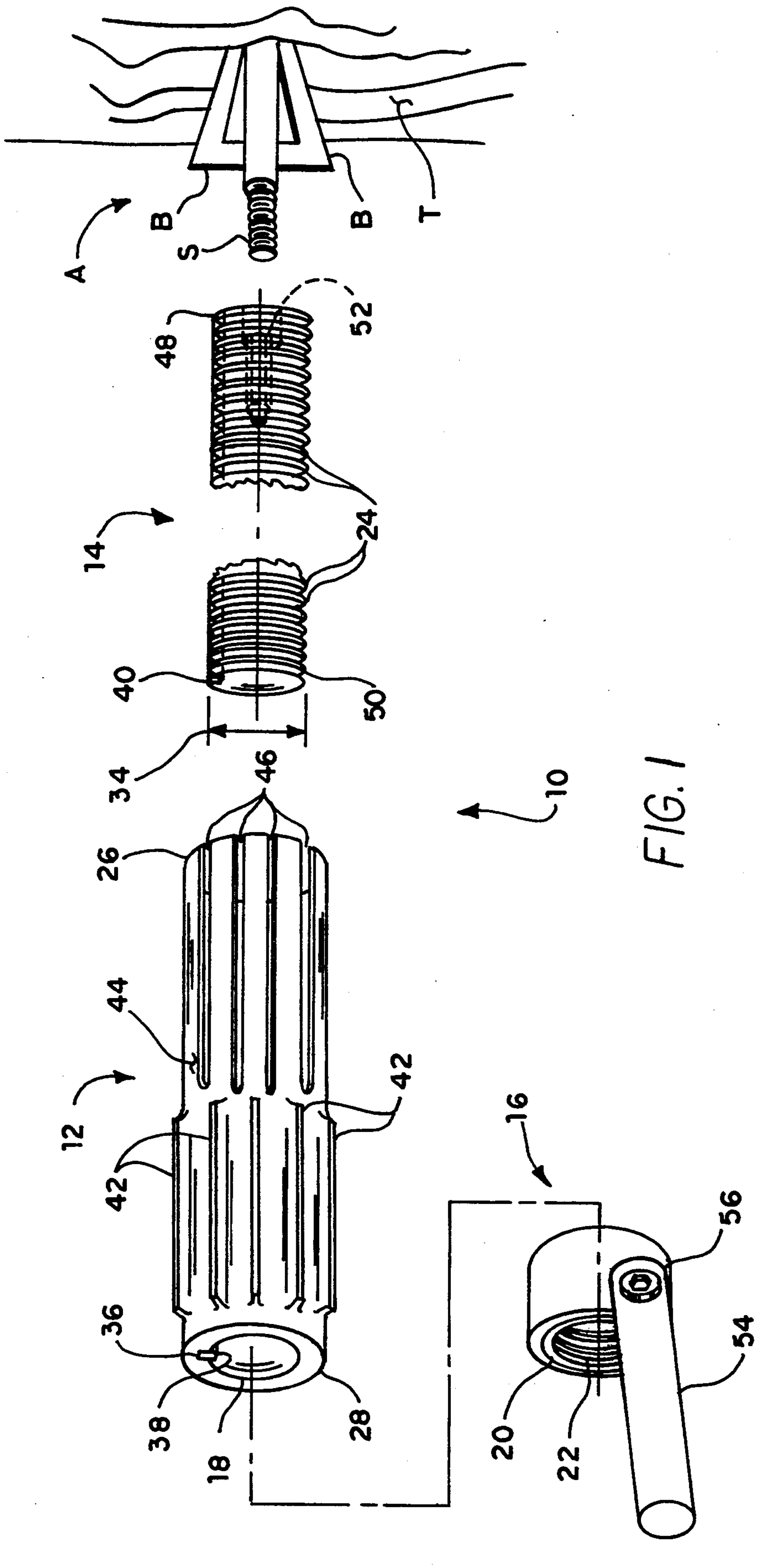
FIG. 1 is an exploded perspective view of the present arrowhead extractor, showing its various components and its installation on an imbedded arrowhead.

Referring now particularly to FIG. 1 of the drawings, the present invention will be seen to relate to an arrowhead extractor 10 which provides for the extraction or withdrawal of an arrowhead from relatively dense material (e.g., wood) into which the arrowhead has become imbedded. Normally, when archery hunting or target shooting, the intended target is relatively soft and pliable, and the removal of an arrowhead from the target (or game) is not difficult. However, an archer will occasionally miss the intended target, and the arrow will strike another object. In the case of relatively dense material (e.g., a tree, designated as T in FIG. 1, or other wood material) the arrowhead may penetrate to the extent that withdrawal of the head can be quite difficult. This is especially true of bladed arrowheads such as the arrowhead A of FIG. 1, due to the relatively thin blades B and the possibility of damage to such blades B.

The present arrowhead extractor 10 provides for ease of removal of arrowheads under such circumstances, and generally comprises a generally cylindrical barrel 12, a threaded extractor shaft 14, and a collar 16. The barrel 12 includes an unthreaded, concentric passage 18 through its center, which passage 18 is sized to provide for the sliding fit of the extractor shaft 14 therethrough. The collar 16 includes a threaded insert 20, which female threads 22 mate with the male threads 24 of the threaded extractor shaft 14.

The barrel 12 includes an arrowhead receiving end 26 and an opposite collar bearing end 28, with the concentric barrel passage 18 having a relatively larger diameter 30 extending from the arrowhead receiving end 26 to a point near the collar bearing end 28, where the passage diameter decreases to a smaller diameter 32 sized to fit closely the major diameter 34 of the threaded extractor shaft 14. The smaller diameter passage portion of the barrel 12 also includes a keyway 36 with a key 38 installed therein, which key 38 engages a mating keyway 40 formed along the entire length of the extractor shaft. With the fixed key 38 of the barrel portion 12 engaging the keyway 40 of the extractor shaft 14, rotational movement of the shaft within and relative to the barrel 12 is precluded, and the shaft 14 is limited to longitudinal sliding movement within the barrel passage 18.

Figure 3:
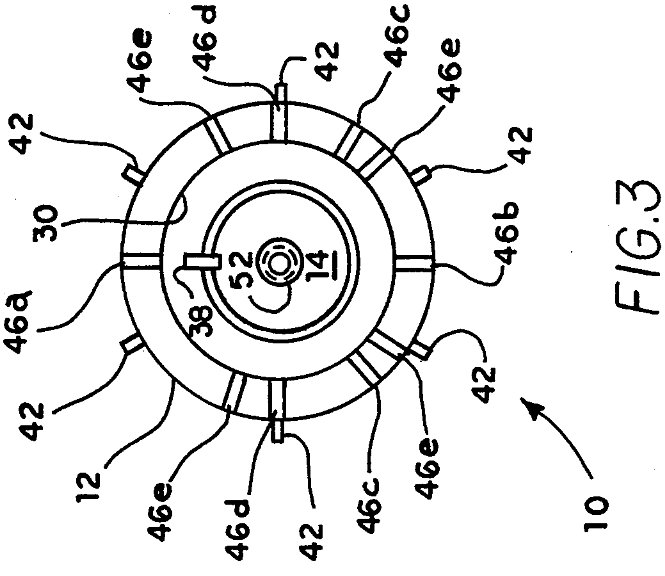
FIG. 3 is an end view of the end of the present arrowhead extractor, showing the slots providing for use with arrowheads having various different blade configurations.

The barrel 12 may also include a plurality of ridges or ribs 42 disposed on the outer surface 44 thereof, with the ribs 42 providing a better grip for the user of the extractor 10. (The specific number of ribs may vary; e.g., FIG. 1 discloses five ribs 42 on one side of the barrel 12, while FIG. 3 shows a total of six ribs 42 disposed about the entire circumference of the barrel 12. The specific number may be provided as desired.) These ribs 42 preferably extend from the collar bearing end 28 of the barrel 12 and parallel to the concentric barrel passage 18, for some distance along the outer surface 44 toward the arrowhead receiving end 26 of the barrel 12.

The barrel portion 12 of the extractor 10 will also be seen to include a plurality of longitudinal slots 46 each having a depth extending between the outer surface 44 and the internal barrel passage 18 of the barrel 12. The slots 46 are provided for clearance of the blades B of a bladed arrowhead A. As bladed arrowheads may have anywhere from two to five blades, a corresponding number and orientation of slots 46 are provided in the barrel 12. In the case of a double bladed arrowhead A with two blades B spaced 180 degrees apart (e.g., FIG. 1), a first slot **46*a* and a second slot 46*b*, *180* degrees around the circumference of the barrel 12, are provided. For three bladed arrowheads, the first slot 46*a* is used with two additional slots 46*c*, each spaced 120 degrees from the other. In the case of four bladed arrowheads, the first slot 46*a* is used along with two other slots 46*d* and slot 46*b*, each spaced 90 degrees from one another, and with five bladed arrowheads the first slot is used along with four other slots 46*e*** each spaced 72 degrees from one another. It will be seen that provision for bladed arrowheads having a greater number of blades than those discussed above may be accomplished by providing an appropriate number and spacing for additional slots, and/or making such slots sufficiently wide so as to encompass blades having different arcuate spacing.

The extractor shaft 14 (shown foreshortened in FIG. 1) has an arrowhead attachment end 48 and an opposite solid end 50. The attachment end 48 includes a threaded hole 52 therein, with the female threads having a pitch and diameter sized to mate with the standard male threaded shank S of an arrowhead. As noted above, the unthreaded barrel passage 18 allows the threaded extractor shaft 14 to slide longitudinally therethrough. However, the collar 16 includes a threaded insert 20 therein, as noted above, which threaded insert is formed to mate with the threads 24 of the extractor shaft 14. The collar 16 may also include a handle 54 extending therefrom, which handle 54 may be pivotally secured to the collar 16 by means of a bolt, such as the hexagonal socket head cap screw 56 shown; other attachment means may be used alternatively.

The present arrowhead extractor 10 is preferably formed of materials which are light in weight, yet durable. It has been found that a plastic composite material is quite suitable for the unthreaded major components of the present invention; glass fiber imbedded within a Nylon (tm) matrix has been found to be satisfactory for the barrel portion 12 of the device, providing both light weight and acceptable durability. In a like manner, the outer portion of the collar 16 may be formed of the same material.

However, the threaded portions of the present invention require greater strength due to the localized pressures on the threads. Hence, the threaded extractor shaft 14 and the internally threaded collar insert 20 are preferably formed of metal, e.g., stainless steel for longevity and durability in field conditions. The handle 54 may be formed of any suitable material providing sufficient strength for the leverage required; aluminum has been found to be suitable in terms of weight and strength.

Figure 2:
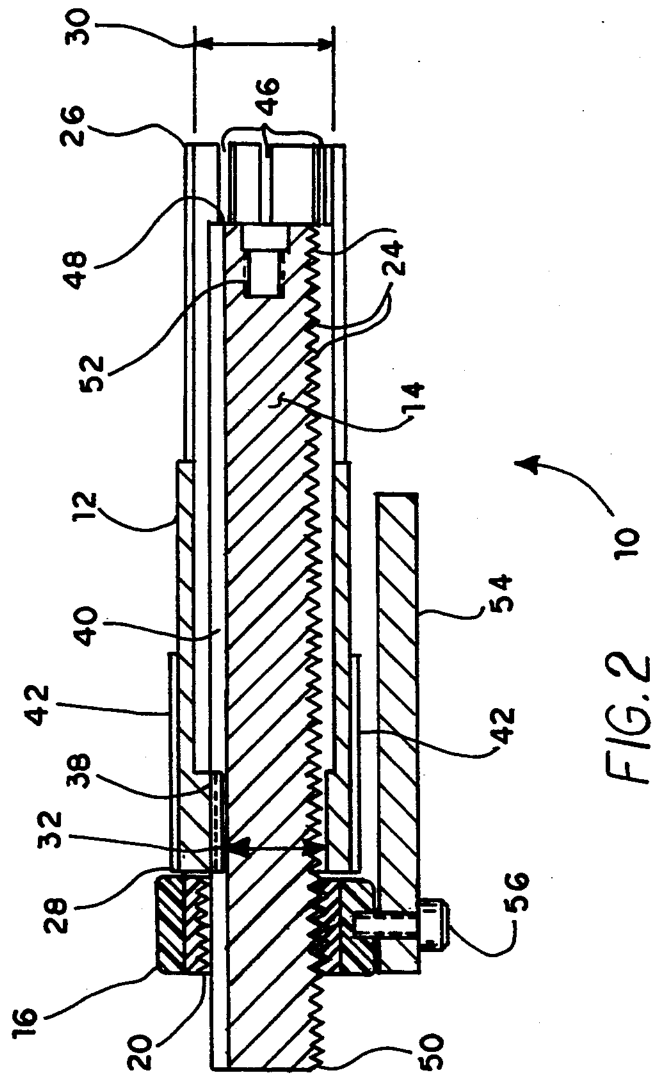
FIG. 2 is a side view in section of the present arrowhead extractor, showing its various components in an assembled state.

Operation of the present invention may best be seen by reference to FIG. 1. When an arrowhead A becomes imbedded in a dense material, e.g., the tree T shown, considerable force is often required for the removal of the arrowhead. The present arrowhead extractor facilitates such removal. First, the shaft (not shown) of the arrow is removed, exposing the threaded shank S of the arrowhead, and the extractor shaft 14 is threaded onto the shank S of the arrowhead A. The barrel 12 of the extractor 10 is then placed over the arrowhead A with the appropriate slots 46 aligned for clearance of the blades B of the arrowhead A, and the keyway 40 of the extractor shaft 14 aligned with the key 38 within the smaller diameter portion 32 of the barrel passage 18. (The present invention may also be used with non-bladed arrowheads, in which case the blade clearance slots 46 are superfluous.) The solid end 50 of the extractor shaft 14 will extend from the collar bearing end 28 of the barrel 12, due to the relatively longer length of the extractor shaft 14, as shown in FIG. 2. The collar 16 is then threaded onto the solid end 50 of the extractor shaft 14, by means of the female threads 22 of the collar insert 20 and the male threads 24 of the extractor shaft 14. It will be seen that, as the collar 16 is threadedly advanced along the length of the extractor shaft 14, the barrel 12 will become compressed between the tree T or other article in which the arrowhead A is imbedded, and the collar 16. The result will be a tensile force on the extractor shaft 14, which will tend to withdraw the arrowhead A from the dense object in which it is imbedded. The handle 54 of the collar 16 may be used to provide greater leverage and mechanical advantage as needed. The extractor shaft is precluded from rotation relative to the barrel 12 due to the fixed key 38 within the barrel 12, and the cooperating keyway 40 of the extractor shaft 12. The arrowhead receiving end 26 of the barrel 12 will be compressed against the article in which the arrowhead A is imbedded, and thus be restrained from turning; the ribs 42 on the outer surface of the barrel 12 may be gripped to prevent turning of the barrel 12 if additional assistance is required.

After the arrowhead A has been removed from the object in which it was imbedded, the collar 16 may be unthreaded from the extractor shaft 14 to withdraw the blades B (if any) of the arrowhead A from the slots 46, whereupon the shank S of the arrowhead A may be unthreaded from the extractor shaft 14 and reattached to the arrow shaft for further use.

The present invention provides even further uses than the extraction procedure described above. For example, often an arrowhead shank S will become bent when the arrow strikes a dense material; such is usually evident when the archer retrieves the arrow, and/or removes the arrow shaft for removal of the arrowhead from its imbedded state. The (preferably steel) extractor shaft 14 may be used to straighten the shank S, by threading it onto the shank and arcuately moving the extractor to rebend and straighten the shank S. This cannot be done using the relatively light and weak, hollow aluminum arrow shafts commonly used. The device provides further utility in holding broadhead (bladed) arrowheads for sharpening and/or removing or installing blades in the arrowhead shank, by threadedly locking the shank onto the end of the extractor shaft 14 and placing the extractor shaft into the barrel 12. As the arrowhead shank is tightly threaded and locked onto the extractor shaft 14, and the extractor shaft 14 is precluded from rotation by means of the key and keyway discussed above, the blades are held in a stationary position relative to the barrel 12 for work thereon without undue danger of cuts or other injuries from the relatively sharp blades. The barrel 12 is also useful for assisting in the attachment or removal of arrow shafts from bladed arrowheads, by inserting the blades of the arrowhead into the appropriate slots 46 of the barrel with the shank S extending within the barrel passage 18. An arrow shaft may then be threaded onto or removed from the arrowhead shank with the user holding the barrel 12, without the user having to handle the bladed arrowhead directly; the blades of the arrowhead are precluded from turning by their capture within the slots 46 of the barrel 12.

Accordingly, the present arrowhead extractor 10 provides not only for the extraction of arrowheads from dense materials into which they have become imbedded, but also for a variety of additional uses related to the archery field. The present invention will be seen to be extremely valuable in the field for the archer, and to be an extremely versatile tool.

It is to be understood that the present invention is not limited to the sole embodiment described above, but encompasses any and all embodiments within the scope of the following claims.

I claim:

1. An arrowhead extractor providing for the extraction of an arrowhead having a threaded shank from a dense object, said arrowhead extractor comprising:

a substantially cylindrical barrel portion having an exterior surface, an arrowhead receiving end, an opposite collar bearing end, and a concentric internal passage therethrough, with a keyway formed within said concentric internal passage and parallel thereto with said keyway including a key affixed therein, said exterior surface of said barrel portion includes a plurality of ribs formed thereon, with said ribs being disposed parallel to said concentric passage through said barrel portion and providing gripping means for the user of said arrowhead extractor;

an extractor shaft slidably installed within said barrel portion, said extractor shaft having a length longer than said barrel portion, a threaded exterior surface, an arrowhead attachment end including a concentric threaded hole therein with said threaded hole being adapted for threaded attachment to the threaded shank of the arrowhead, an opposite solid end, and a shaft keyway formed in said threaded exterior surface between said arrowhead attachment end and said opposite solid end and adapted to mate slidably with said key of said barrel portion to preclude rotational movement of said extractor shaft relative to said barrel portion, and;

a collar installed adjacent said collar bearing end of said barrel portion, said collar including a concentric passage therethrough, with said concentric passage of said collar including threads therein adapted to mate with said threaded exterior surface of said threaded extractor shaft, whereby;

said threaded extractor shaft is installed upon the threaded shank of the arrowhead by said threaded hole in said arrowhead attachment end, said barrel portion is installed over said extractor shaft with said arrowhead receiving end adjacent the arrowhead, said solid end of said extractor shaft extending from said collar bearing end of said barrel portion, and said collar is threadedly installed upon said solid end of said extractor shaft.

2. The arrowhead extractor of claim 1 wherein:

said internal passage of said barrel portion includes a relatively smaller diameter portion adjacent said collar bearing end and adapted to fit closely said extractor shaft, and a relatively larger diameter portion extending from said arrowhead receiving end to said relatively smaller diameter portion, with said relatively smaller diameter portion including said keyway and said key therein.

3. The arrowhead extractor of claim 1 wherein:

said arrowhead receiving end of said barrel portion includes a plurality of elongate slots therein, with said slots each having a depth extending between said concentric internal passage and said exterior surface, whereby said slots are passed over the blades of a bladed arrowhead to provide clearance therefor and to preclude damage thereto as the arrowhead is withdrawn from a dense object by means of said arrowhead extractor.

4. The arrowhead extractor of claim 3 wherein:

said plurality of elongate slots comprises a first slot and a second slot arcuately disposed 180 degrees from said first slot, with said first slot and said second slot being adapted for the passage of the blades of a two bladed arrowhead therein.

5. The arrowhead extractor of claim 3 wherein:

said plurality of elongate slots comprises a first slot, a second slot arcuately disposed 120 degrees from said first slot, and a third slot arcuately disposed 240 degrees from said first slot, with said first, said second, and said third slot being adapted for the passage of the blades of a three bladed arrowhead therein.

6. The arrowhead extractor of claim 3 wherein:

said plurality of elongate slots comprises a first slot, a second slot arcuately disposed 90 degrees from said first slot, a third slot arcuately disposed 180 degrees from said first slot, and a fourth slot arcuately disposed 270 degrees from said first slot, with said first slot, said second slot, said third slot, and said fourth slot being adapted for the passage of the blades of a four bladed arrowhead therein.

7. The arrowhead extractor of claim 3 wherein:

said plurality of elongate slots comprises a first slot, a second slot arcuately disposed 72 degrees from said first slot, a third slot arcuately disposed 144 degrees from said first slot, a fourth slot arcuately disposed 216 degrees from said first slot, and a fifth slot arcuately disposed 288 degrees from said first slot, with said first slot, said second slot, said third slot, said fourth slot, and said fifth slot being adapted for the passage of the blades of a five bladed arrowhead therein.

8. The arrowhead extractor of claim 3 wherein:

said plurality of elongate slots comprises a first slot, a second slot arcuately disposed 72 degrees from said first slot, a third slot arcuately disposed 90 degrees from said first slot, a fourth slot arcuately disposed 120 degrees from said first slot, a fifth slot arcuately disposed 144 degrees from said first slot, a sixth slot arcuately disposed 180 degrees from said first slot, a seventh slot arcuately disposed 216 degrees from said first slot, an eighth slot arcuately disposed 240 degrees from said first slot, a ninth slot arcuately disposed 270 degrees from said first slot, and a tenth slot arcuately disposed 288 degrees from said first slot, with said first slot and said sixth slot being adapted for the passage of the blades of a two bladed arrowhead therein, said first slot, said fourth slot, and said eighth slot being adapted for the passage of the blades of a three bladed arrowhead therein, said first slot, said third slot, said sixth slot, and said ninth slot being adapted for the passage of the blades of a four bladed arrowhead therein, and said first slot, said second slot, said fifth slot, said seventh slot, and said tenth slot being adapted for the passage of the blades of a five bladed arrowhead therein.

9. The arrowhead extractor of claim 1 wherein:
said collar includes handle means extending therefrom.

10. The arrowhead extractor of claim 9 wherein:
said handle means is pivotally attached to said collar.

11. The arrowhead extractor of claim 9 wherein:
at least said handle means is formed of aluminum.

12. The arrowhead extractor of claim 1 wherein: at least said barrel portion is formed of synthetic composite material.

13. The arrowhead extractor of claim 12 wherein:
said synthetic composite material comprises glass fiber imbedded within a Nylon matrix.

14. The arrowhead extractor of claim 1 wherein:
at least said extractor shaft and said key affixed within said keyway of said barrel are formed of steel.

15. An arrowhead extractor providing for the extraction of an arrowhead having a threaded shank from a dense object, said arrowhead extractor comprising:
a substantially cylindrical barrel portion having an exterior surface, an arrowhead receiving end, an opposite collar bearing end, and a concentric internal passage therethrough, with a keyway formed within said concentric internal passage and parallel thereto with said keyway including a key affixed therein;
an extractor shaft slidably installed within said barrel portion, said extractor shaft having a length longer than said barrel portion, a threaded exterior surface, an arrowhead attachment end including a concentric threaded hole therein with said threaded hole being adapted for threaded attachment to the threaded shank of the arrowhead, an opposite solid end, and a shaft keyway formed in said threaded exterior surface between said arrowhead attachment end and said opposite solid end and adapted to mate slidably with said key of said barrel portion to preclude rotational movement of said extractor shaft relative to said barrel portion; and
a collar installed adjacent said collar bearing end of said barrel portion, said collar including a concentric passage therethrough, with said concentric passage of said collar including threads therein adapted to mate with said threaded exterior surface of said threaded extractor shaft, said collar further including a handle pivotally attached to and extending from said collar;
whereby said threaded extractor shaft is installed upon a threaded shank of an arrowhead by said threaded hole in said arrowhead attachment end, said barrel portion is installed over said extractor shaft with said arrowhead receiving end adjacent the arrowhead, said solid end of said extractor shaft extending from said collar bearing end of said barrel portion, and said collar is threadedly installed upon said solid end of said extractor shaft.

16. An arrowhead extractor providing for the extraction of an arrowhead having a threaded shank from a dense object, said arrowhead extractor comprising:
a substantially cylindrical barrel portion having an exterior surface, an arrowhead receiving end, an opposite collar bearing end, and a concentric internal passage therethrough, with a keyway formed within said concentric internal passage and parallel thereto with said keyway including a key affixed therein;
an extractor shaft slidably installed within said barrel portion, said extractor shaft having a length longer than said barrel portion, a threaded exterior surface, an arrowhead attachment end including a concentric threaded hole therein with said threaded hole being adapted for threaded attachment to the threaded shank of the arrowhead, an opposite solid end, and a shaft keyway formed in said threaded exterior surface between said arrowhead attachment end and said opposite solid end and adapted to mate slidably with said key of said barrel portion to preclude rotational movement of said extractor shaft relative to said barrel portion; and
a collar installed adjacent said collar bearing end of said barrel portion, said collar including a generally toroidally shaped external component with a toroidally shaped internal component imbedded therein, said internal component including a concentric passage therethrough, said concentric passage of said collar including threads therein adapted to mate with said threaded exterior surface of said threaded extractor shaft;
whereby said threaded extractor shaft is installed upon the threaded shank of the arrowhead by said threaded hole in said arrowhead attachment end, said barrel portion is installed over said extractor shaft with said arrowhead receiving end adjacent the arrowhead, said solid end of said extractor shaft extending from said collar bearing end of said barrel portion, and said collar is threadedly installed upon said solid end of said extractor shaft.

17. The arrowhead extractor of claim 16 wherein at least said external component of said collar is formed of synthetic composite material.

18. The arrowhead extractor of claim 17 wherein said synthetic composite material comprises glass fiber imbedded within a Nylon matrix.

19. The arrowhead extractor of claim 16 wherein at least said internal component of said collar is formed of stainless steel.

* * * * *